March 21, 1944. A. M. ROCKWELL 2,344,735
ENGINE MOUNT
Filed Feb. 27, 1942 3 Sheets-Sheet 1
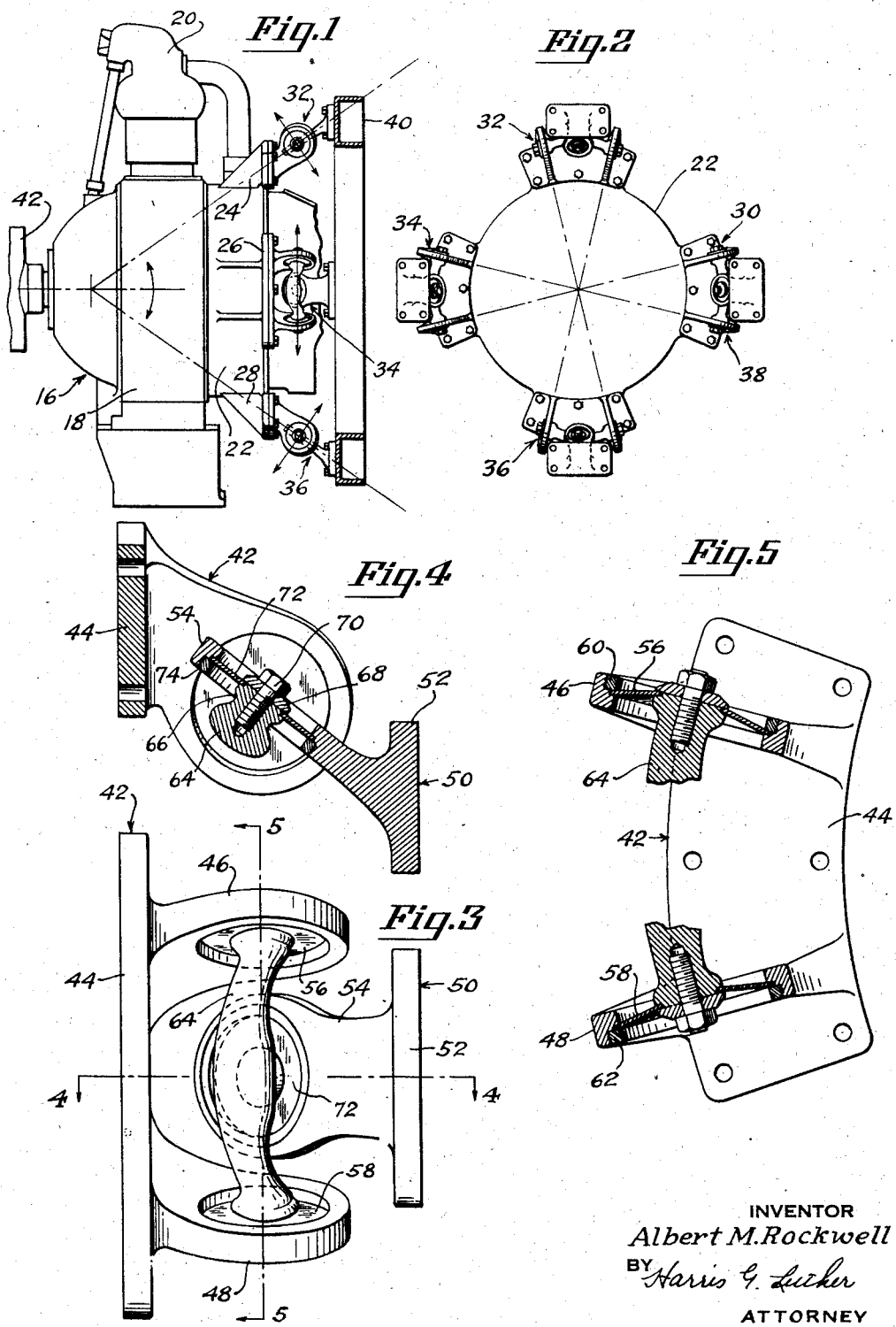
INVENTOR
Albert M. Rockwell
BY Harris G. Luther
ATTORNEY March 21, 1944.  A. M. ROCKWELL  2,344,735
ENGINE MOUNT
Filed Feb. 27, 1942  3 Sheets-Sheet 2
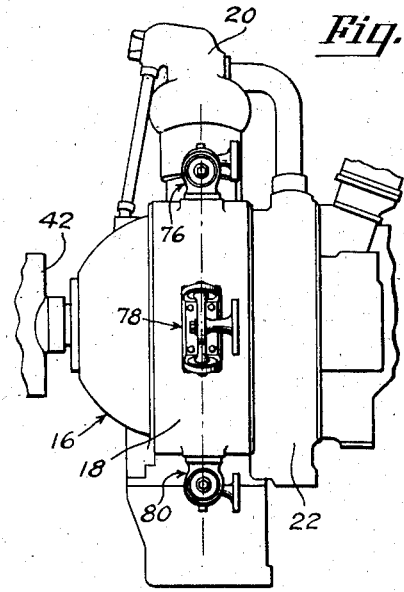
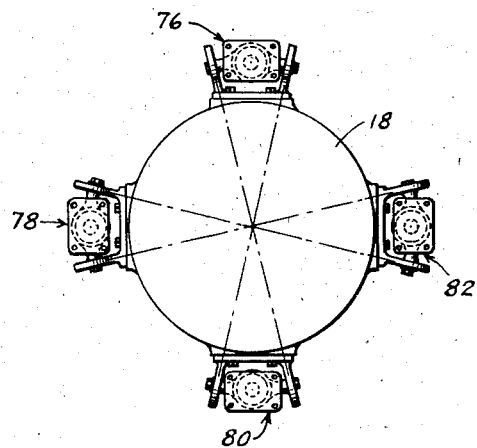
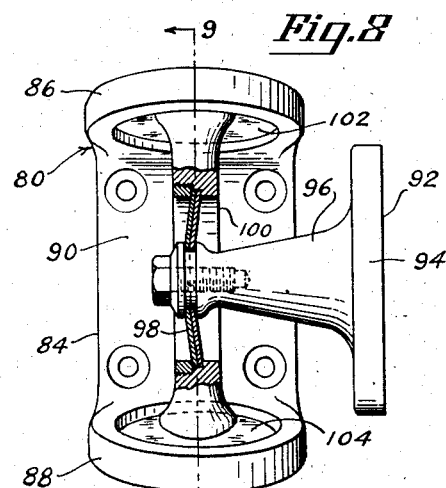
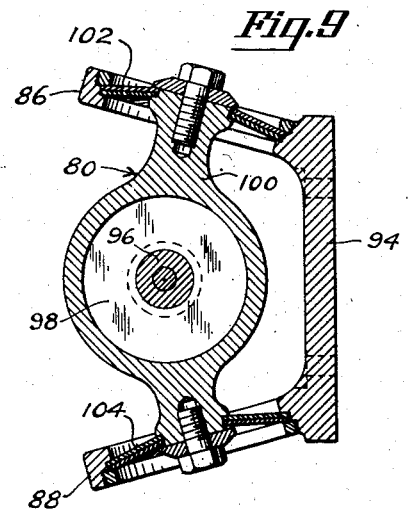
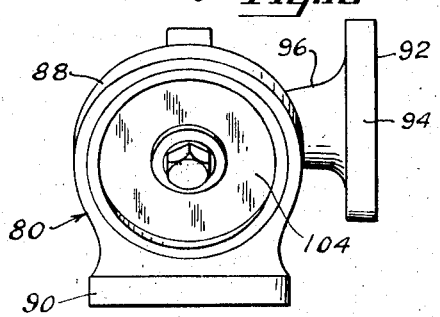
INVENTOR
Albert M. Rockwell
BY Harris G. Luther
ATTORNEY March 21, 1944. A. M. ROCKWELL 2,344,735
ENGINE MOUNT
Filed Feb. 27, 1942 3 Sheets-Sheet 3
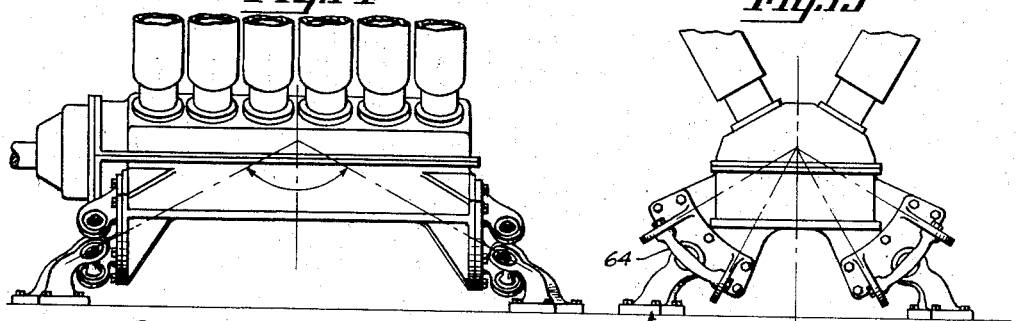
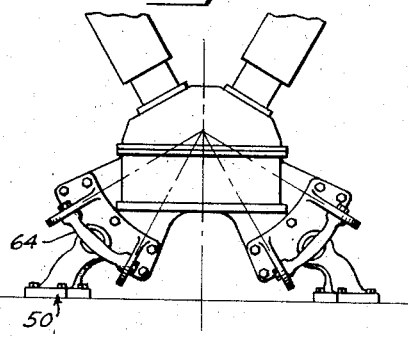
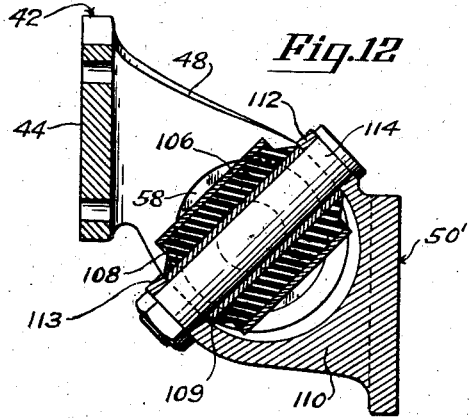
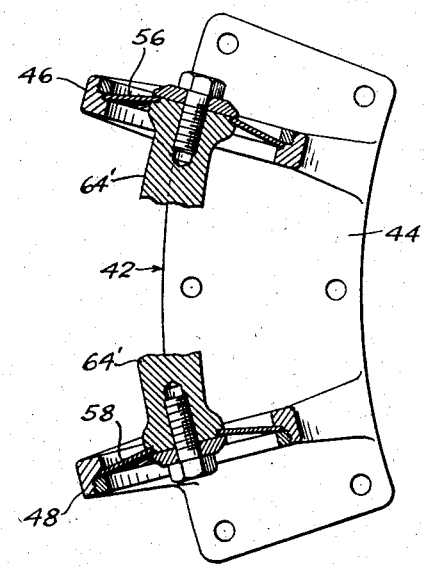
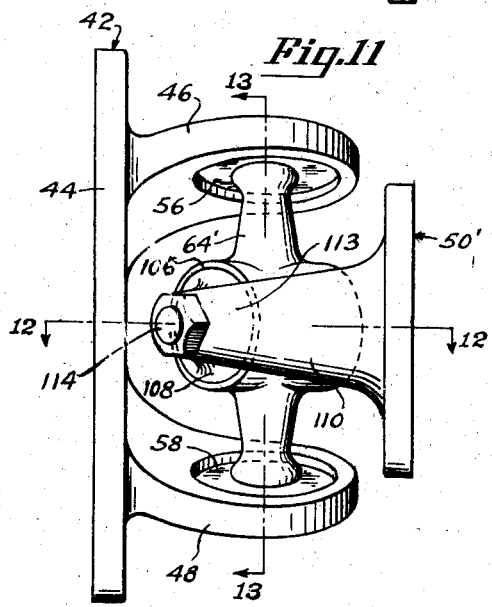
INVENTOR
Albert M. Rockwell
BY Harris G. Luther
ATTORNEY Patented Mar. 21, 1944

2,344,735

UNITED STATES PATENT OFFICE 2,344,735

ENGINE MOUNT

Albert M. Rockwell, Glastonbury, Conn., assignor to United Aircraft Corporation, East Hartford, Conn., a corporation of Delaware Application February 27, 1942, Serial No. 432,597

13 Claims. (Cl. 248—5)

This invention relates to an improved engine mount for a vehicle engine and has particular reference to an improved flexible mount particularly adapted to suppress the transmission of vibrational forces between the engine and the engine carrying vehicle.

An object of the invention resides in the provision of an improved engine mount utilizing the variable spring rate of Belleville type springs to accommodate the mount to variations in engine torque and vibration rate and amplitude.

A further object resides in the provision of an improved engine mount of the character indicated which is substantially rigid in some directions and has a desired amount of flexibility in other directions.

A still further object resides in the provision of an improved engine mount of the character indicated in which the spring rate or resiliency of the mount varies inversely with variations in engine torque.

Other objects and advantages will be more particularly pointed out hereinafter or will become apparent as the description proceeds.

In the accompanying drawings, in which like reference numerals are utilized to designate similar parts throughout, there is illustrated in several somewhat variant forms a suitable mechanical embodiment for the purpose of disclosing the invention. The drawings, however, are for the purpose of illustration only and are not to be taken as limiting or restricting the invention since it will be apparent to those skilled in the art that various changes in the illustrated embodiment may be resorted to without in any way exceeding the scope of the invention.

In the drawings,

Fig. 1 is a somewhat diagrammatic side-elevational view of a vehicle engine showing the application thereto of engine mounting elements constructed according to the invention.

Fig. 2 is a diagrammatic rear-elevational view of the engine and engine mount illustrated in Fig. 1 the mounting ring being omitted.

Fig. 3 is a top-plan view of one of the engine mount units illustrated in Figs. 1 and 2.

Fig. 4 is a sectional view on the line 4—4 of Fig. 3.

Fig. 5 is a sectional view on the line 5—5 of Fig. 3.

Fig. 6 is a diagrammatic side-elevational view of a vehicle engine showing the application thereto of engine mount units similar to those illustrated in Fig. 1 but disposed at a different position relative to the engine and incorporating minor structural differences to accommodate them to the different position.

Fig. 7 is a diagrammatic rear-elevational view of the engine and mounting unit illustrated in Fig. 6.

Fig. 8 is a top-plan view of one of the mounting units shown in Fig. 6 a portion being broken away and shown in section to better illustrate the construction thereof.

Fig. 9 is a sectional view on the line 9—9 of Fig. 8.

Fig. 10 is an end-elevational view of the mounting bracket shown in Fig. 8.

Fig. 11 is a top-plan view of a still further modified form of engine mount unit.

Fig. 12 is a transverse-sectional view on the line 12—12 of Fig. 11.

Fig. 13 is a sectional view on the line 13—13 of Fig. 11.

Fig. 14 is a diagrammatic side-elevational view of an in-line type of vehicle engine showing the application thereto of mounting units constructed according to the invention, and Fig. 15 is a diagrammatic end-elevational view of the engine and mounting units shown in Fig. 14.

Referring to the drawings in detail and particularly to Figs. 1 to 5 inclusive, the numeral 16 generally indicates a vehicle engine, the form of engine illustrated being a radial air-cooled internal-combustion engine such as is conventionally employed for the propulsion of aircraft. It is to be understood, however, that this particular type of engine is illustrated only for purposes of convenience in the disclosure and the invention is not limited to any particular form of vehicle engine.

The engine may have a crankcase portion 18 upon which are mounted a plurality of radially extending cylinders, one of which is indicated at 20, and a blower section 22 upon which are formed or suitably secured attaching pads 24, 26, 28 and 30 for the engine mounting units generally indicated at 32, 34, 36 and 38. Each bracket is firmly secured at one side to a corresponding engine attached mounting pad and at the opposite side to some rigid portion of the vehicle structure, such as the engine mounting ring 40. The engine illustrated in Figs. 1 and 2 is, as mentioned above, of a form conventionally employed for the propulsion of aircraft and may drive a suitable aircraft propeller, as indicated at 42.

It is well known that an internal combustion engine of the character indicated has, in operation, a complex vibration characteristic consisting of many vibration effects of different amplitudes and frequencies acting in different directions. The principal direction of vibration induced movements from a consideration of proper engine mounting are those movements in a torsional direction, those tending to produce a wobbling or universal movement of the engine about some neutral point within the engine, those tending to produce bodily substantially straight line movements of the engine in various radial directions, commonly referred to as shaking forces, and those tending to produce bodily movement of the engine in a fore and aft direction. A satisfactory engine mount must be able to resiliently resist the more important of these vibrational movements of the engine as well as support the weight of the engine and resist the engine torque.

It is also well known that when the engine is operating under idling conditions the vibrational movements thereof are of a relatively low frequency and high amplitude and that the frequency increases and the amplitude decreases as the power and speed of the engine increase. This produces a condition under which a mount soft enough to suppress the transmission of vibration from the engine to the engine mount at conditions of engine power operation will permit excessive engine movements during idling operation of the engine and a mount sufficiently rigid to suppress engine movements under idling operation conditions will, if its resiliency does not change, be too rigid to properly suppress the transmission of vibrational movements under conditions of engine power operation.

The present invention contemplates the provision of an improved engine mount which resiliently resists the reaction to engine power and the more important engine vibrations and which tends to increase rather than decrease in flexibility as the engine load applied thereto increases.

According to the present invention the mount for a radial engine, such as that illustrated in Fig. 1, comprises a plurality of mounting units or brackets annularly spaced about the rotational axis of the engine and interconnected between the engine and a suitable engine supporting structural element of the vehicle. Each bracket comprises a substantially rigid element rigidly connected to the engine, a substantially rigid element rigidly connected to the vehicle structure, and a flexible connection between the two rigid elements. As the brackets are all similar in construction a detailed description of only one complete bracket is believed entirely adequate for the purpose of this disclosure. The bracket 36 illustrated in Figs. 1 and 2 has been selected for detailed illustration and description. In this bracket the engine attached element, generally indicated at 42, comprises a base plate 44 provided with suitable apertures for the reception of bolts or rivets for attaching the element to the respective engine pad 28 and with a pair of spaced apertured lugs 46 and 48 extending substantially perpendicularly from the surface of the plate 44 opposite the surface secured to the engine pad and provided with relatively large substantially circular apertures. The ring attached element, generally indicated at 50, has a base plate 52 suitably apertured for attachment to the mounting ring 40 and a single lug 54 extending from the surface of the base plate opposite that in contact with the ring and also provided with a relatively large substantially circular aperture. The lugs 46, 48, and 54 are so arranged that while the lugs 46 and 48 are disposed in planes substantially radial to the rotational axis of the engine the lug 54 has its major surfaces in planes intersecting the axis of rotation at or near the neutral point of certain selected modes of engine vibration and is positioned between the lugs 46 and 48. Secured in the aperture in each lug 46 and 48 there is a dished sheet metal spring, the spring for the lug 46 being indicated at 56 and that for the lug 48 being indicated at 58. Each spring is secured in the aperture in the respective lug by a suitable means such as the respective clamp nuts 60 and 62 and the dish of the two springs extend in the same direction, as is clearly illustrated in Fig. 5, the direction being such that increase in engine torque will tend to reduce the conical configuration of the springs and bring them toward a flat disk condition. Each spring is provided with a central aperture and a bar member 64 is secured at its ends in the respective apertures by a suitable means such as by means of the shoulders provided at each side of the rim of the dish aperture by radial extensions at the ends of the bar and clamp plates held against the ends of the bar by suitable cap screws. By this means the bar 64 is firmly secured at its ends to the discs 56 and 58 and is resiliently connected by the discs to the engine attached elements 42. Intermediate its length the bar 64 is provided on one side thereof with an extension 66 secured by suitable means such as the clamping plate 68 and cap screw 70 in the center aperture in a flat spring disc 72 secured in the aperture in the lug 54 by a suitable annular clamp nut 74. The spring 72 thus resiliently connects the bar 64 to the ring attached element 50 and the three springs 56, 58 and 72 and the bar 64 provide a resilient connection between the engine attached element 42 and the ring attached element 50.

As is clearly illustrated in Figs. 1 to 5, inclusive, the arrangement of the springs is such that torsional forces of the engine are transmitted through the springs of the various mounting brackets corresponding to the spring 72 of the bracket 36 in directions substantially radially of these flat springs so that the resiliency of the springs is not effective in resisting such torsional forces, these forces being resisted substantially entirely by the disc spring corresponding to the springs 56 and 58. It is a characteristic of springs of the Belleville type, such as the springs 56 and 58, that they are stiffer or more rigid when in their dished or unloaded condition than when their dish or conical configuration has been reduced by the application of a steady load thereto. Thus, the springs 56 and 58 of the bracket 36 and the corresponding springs of the other brackets provide a relatively rigid connection between the engine and its support when the torque is low as when the engine is idling, and the torsional vibrations or fluctuations at idling speed are thus strongly resisted and do not produce engine movements of large amplitudes. As the engine torque increases incident to an increase in engine power, the springs are deformed toward a relatively flat condition and in that condition are relatively soft in resisting torque variations of relatively small magnitudes so that torsional vibrations of the engine at operating power and speed are not transmitted through the mounting unit from the engine to its support at undesirable magnitudes.

The spring 72 and the corresponding springs in the other mounting brackets provide resiliency between the engine and its mount in directions other than the torsional direction. For example, wobbling movements of the engine about the neutral point on the rotational axis would cause deflection of these springs as well as of the torque resisting springs, the vertical component of such a wobbling movement deflecting the flat springs of the upper and lower brackets and the torque resisting springs of the horizontal brackets while the longitudinal component would cause deflection of the flat springs of the longitudinal brackets and of the torque resisting springs of the upper and lower brackets. As the exciting force of such a wobbling movement increases with increase in engine speed and power, it is desirable to have springs with a spring rate which decreases with increases in the spring compressing forces to resist these forces. The flat springs meet this requirement since their resistance increases with distortion from their relatively flat condition.

In the slightly modified form of the invention shown in Figs. 6 to 10, inclusive, the brackets are arranged around the engine in a plane which passes through a point at or adjacent to the center of gravity of the engine and may be arranged around the crankcase section of the engine between adjacent engine cylinders. In this case the mounting brackets have been generally indicated by the numerals 76, 78, 80 and 82 and the bracket 80 has been selected for detailed illustration and description, the brackets all being similar in construction.

In this form the engine attached element 84 is similar to the element 44 particularly illustrated in Figs. 3, 4 and 5 but is attached to the engine in such a manner that its integral apertured lug portions 86 and 88 extend outwardly substantially radially of the engine. The plate like portion 90 of the element 84 between the lugs 86 and 88 is provided with suitable apertures for the reception of bolts or rivets for attaching the element to the corresponding pads formed on the engine crankcase section. The ring attached element 92 has a plate like base portion suitably apertured for attachment to the engine mounting ring and from this base portion 94 there projects a stem 96 secured at its end opposite the base portion in the central aperture of a dished spring member 98 secured in a circular aperture provided in a connecting bar 100 the ends of which are secured respectively in the central apertures of dished spring members 102 and 104 secured in the apertures of the lugs 86 and 88 of the engine attached element 84. The springs 102 and 104 of the bracket 80 and the corresponding springs of the other brackets act in the manner explained above to variably resist the torsional vibrations of the engine. The dished spring 98, however, and the springs corresponding thereto, have a variable rate affected by variations in the thrust produced by the propeller 42 so that these springs become somewhat softer as the propeller thrust increases, thus these springs would be relatively rigid at low engine speeds to hold the engine steady against a vibration of low frequency and high amplitude but would suppress high frequency low amplitude vibrations when the engine speed is high and the thrust relatively large. Thus in the arrangement illustrated in Figs. 6 to 10, inclusive, both sets of springs are variable rate springs one set being affected by variations in torque and the other set being affected by variations in thrust to provide a relatively rigid mount when the engine is operating at low speed and low power and a highly flexible mount when the engine is operating at high speeds or high power. These brackets may also act to cushion shock loads between the engine and its support such as might be caused by landing an airplane or taxiing one over rough ground, such cushioning action would be accomplished largely by deflection of the springs 98.

In the form of the invention shown in Figs. 6 to 10, inclusive, the springs illustrated are of a multiple disc type, in the illustrated form two similar discs being utilized to constitute each spring. The invention is not limited to any particular number of discs and the springs may be formed of one disc as illustrated in Figs. 1 to 5, inclusive, or of two or more discs as may be desired. The use of multiple discs to form a single spring provides a desirable damping effect in the spring and enables the spring to convert a large portion of the vibration energy into heat through friction between the component discs of each spring to thereby provide a highly desirable damping effect which tends to reduce the total amount of engine vibration.

In the form of the invention shown in Figs. 11, 12 and 13 the engine attached elements and the spring carried thereby is the same as that in either of the two forms described above, the elements shown in Figs. 1 to 5, inclusive, having been selected for the purpose of illustration. The bar 64' is secured at its ends to the dish springs 56 and 58 in the manner indicated above but at its intermediate portion, instead of connecting with a third spring, is provided with a hollow cylindrical portion 106 within which is a resilient connecting element comprising a bushing 108 formed of rubber or similar resilient material and bonded to the cylindrical portion 106 and to sleeve 109 extending substantially coaxially therethrough. The ring attached member 50' is provided with a bifurcated stem 110 the arms 112 and 113 of which overlie the ends of the sleeve 109 and are apertured to receive a bolt 114 which passes through the arms and the sleeve 109 to secure the member 50' to the bar 64'. The sleeve 109 is somewhat longer than the cylindrical portion 106 so that the stem 110 may move relative to the bar 64' in a direction creating shear forces in the resilient bushing 108. The stem may also move in a direction imposing compressional forces on the material of the bushing but movement in this direction relative to the bar 64' will be against somewhat greater resistance than movement in the shear imposing direction due to the particular shape of the resilient bushing. Substitution of the resilient connecting unit for the third spring shown in Figs. 4 and 8 provides freedom at this connection in all directions instead of in the single direction provided by the spring and is particularly adapted for those installations where it is desired to provide some resiliency for all movements of the engine relative to the engine supporting structure.

Figs. 14 and 15 illustrate the application of any one form of the above-described mounting units to a long or in-line engine. In order to support such an engine by the improved mounting units the engine is provided at each end with mounting pads which extend radially outward from the engine crankcase. Two such pads at each end of the engine making a total of four pads have been shown as an illustrative installation. The engine attached members of corresponding resilient mounting units are secured to the corresponding engine parts and the mount attached elements of the units are secured to an engine supporting structure either rigidly secured to or constituting an integral part of the frame of the vehicle which carries the engine. Engine torque is resisted by the dished springs at the ends of the connecting bar 64 and other vibrational movements of the engine may be resiliently resisted by the flexible connection between this bar and the support attached element 50 which resilient connection may conveniently comprise a bushing of resilient material such as is illustrated in Figs. 11, 12, and 13.

While a suitable mechanical embodiment in several somewhat modified forms has been hereinabove described and illustrated in the accompanying drawings, for the purpose of disclosing the invention, it is to be understood that the invention is not limited to the particular embodiment so described and illustrated but that such changes in the size, shape and arrangement of the various parts may be resorted to as come within the scope of the sub-joined claims.

Having now described the invention so that others skilled in the art, may clearly understand the same, what it is desired to secure by Letters Patent is as follows:

1. An engine mount bracket comprising an engine attachable element, a support attachable element, and a resilient connection between said elements including dished disc springs secured at their peripheries to one of said elements and at their centers to the other of said elements and having their convex surfaces facing in a direction such that the dish of said springs is reduced by the reaction to engine power.

2. An engine mount bracket comprising a member having a pair of apertured lugs, a concavo-convex disc spring peripherally secured in each lug, a bar secured at its ends to the center portions of said springs, and a second member secured to said bar intermediate the length of said bar, one of said members being attachable to an engine and the other member being attachable to an engine support.

3. The arrangement as set forth in claim 2 including a flexible connection between said second member and said bar.

4. The arrangement as set forth in claim 2 including an apertured portion in said bar intermediate the length thereof, a dished disc spring peripherally secured in said portion, and a connection between said second member and the center of said spring.

5. The arrangement as set forth in claim 2 including a cylinder carried by said bar, a core carried by said second member and passing through said cylinder, and a bushing of resilient material between said cylinder and said core.

6. The arrangement as set forth in claim 2 including a resilient connection between said second member and said bar, said connection comprising an outer sleeve, an inner sleeve, and a bushing of resilient material between said sleeves, the axis of said connection passing between said concavo-convex springs.

7. The arrangement as set forth in claim 2 including concavo-convex springs each comprising two or more discs in contact with each other and offering frictional resistance to deformation of said springs.

8. An engine mount comprising a bracket member including two apertured lugs, a disc spring secured at its periphery in the aperture of each lug, a bar secured at its opposite ends to the center portions of said springs and having a boss thereon intermediate its ends, a second bracket member including a single apertured lug, and a disc spring secured at its periphery in the aperture thereof and secured at its central portion to said boss, one of said members being attachable to an engine and the other to an engine support.

9. An engine mount for attaching an engine to a support comprising bracket elements adapted to be rigidly secured to said engine and said support in pairs of complementary elements, and resilient torque resisting means between the bracket elements of each pair comprising a concavo-convex disc spring circumferentially secured to one of said elements and centrally secured to the other element in position such that its curvature is reduced by the application of engine torque reaction thereto.

10. An engine mount for attaching an engine to a support comprising bracket elements adapted to be rigidly secured to said engine and said support in pairs of complementary elements, and resilient torque resisting means between the bracket elements of each pair comprising a pair of spaced apart concavo-convex disc springs circumferentially secured to one of said elements and centrally secured to the other element in position such that the curvature of both springs is reduced by the application of engine torque reaction thereto.

11. An engine mount for attaching an engine to a support comprising bracket elements adapted to be rigidly secured to said engine and said support in pairs of complementary elements, and resilient torque resisting means between the bracket elements of each pair comprising a pair of concavo-convex disc springs circumferentially secured to one of said bracket elements in position to resiliently resist engine torque by reduction of the curvature thereof, a bar between said springs connected at its ends to the centers of said springs, and a resilient connection between said bar and the other of said bracket elements flexible along an axis substantially normal to the axis of flexibility of said concavo-convex springs.

12. An engine mount bracket comprising, an engine attachable element, a support attachable element, and means for resiliently connecting said elements including disc springs carried by said elements in planes angularly related one to the other and a rigid member having angularly related attaching portions connected to said springs.

13. Means for flexibly securing a vehicle engine to an engine carrying portion of a vehicle comprising a plurality of engine mounting brackets, each including an engine attachable element, a support attachable element, and means resiliently connecting said elements including disc springs carried by said elements in planes angularly related one to the other and a rigid member having angularly related attaching portions connected to resilient portions of said springs.

ALBERT M. ROCKWELL.